United States Patent [19]
Nishimura et al.

[11] Patent Number: 5,815,335
[45] Date of Patent: Sep. 29, 1998

[54] RECORDING AND REPRODUCING APPARATUS WITH MECHANICAL ADJUSTMENT DATA STORED IN MEMORY ON MECHANICAL MECHANISM ASSEMBLY

[75] Inventors: Hiroshi Nishimura, Saitama; Koichi Tanaka, Kanagawa, both of Japan

[73] Assignee: Sony Corporation, Tokyo, Japan

[21] Appl. No.: 822,544

[22] Filed: Mar. 19, 1997

Related U.S. Application Data

[63] Continuation of Ser. No. 531,340, Sep. 20, 1995, abandoned, which is a continuation of Ser. No. 156,848, Nov. 24, 1993, abandoned.

[30] Foreign Application Priority Data

Dec. 2, 1992 [JP] Japan .................................. 4-350306

[51] Int. Cl.⁶ .................................................. G11B 15/18
[52] U.S. Cl. ............................................ 360/69; 360/137
[58] Field of Search ........................... 360/31, 69, 78.07, 360/137; 371/16.5; 369/11

[56] References Cited

U.S. PATENT DOCUMENTS

| | | | |
|---|---|---|---|
| 4,383,285 | 5/1983 | Staar | 360/132 |
| 4,792,865 | 12/1988 | Baumeister | 360/69 |
| 4,814,924 | 3/1989 | Ozeki | 360/133 |
| 4,970,726 | 11/1990 | Carn et al. | 371/16.5 |
| 5,150,263 | 9/1992 | Sakamoto et al. | 360/69 |
| 5,287,478 | 2/1994 | Johnston et al. | 360/75 |
| 5,359,504 | 10/1994 | Ohmi et al. | 360/137 |

FOREIGN PATENT DOCUMENTS 5324367  2/1993  Japan .

OTHER PUBLICATIONS

Webster's II New Riverside University Dictionary, The Riverside Publishing Co. 1984 p. 126.

*Primary Examiner*—Aristotelis M. Psitos
*Assistant Examiner*—Larry T. Cullen
*Attorney, Agent, or Firm*—Jay H. Maioli

[57] ABSTRACT

In a recording and/or reproducing apparatus, a memory is provided within a mechanism portion which is formed separately from a control portion, but contained in one housing. The memory stores a negative adjusting data corresponding to the mechanism portion which is necessary to operate the mechanism portion in the specified condition, so that even if one of the mechanism portion or control portion is replaced separately, the storing operation of new adjusting data can be omitted. Thereby, such a replacement operation can be simplified.

5 Claims, 4 Drawing Sheets

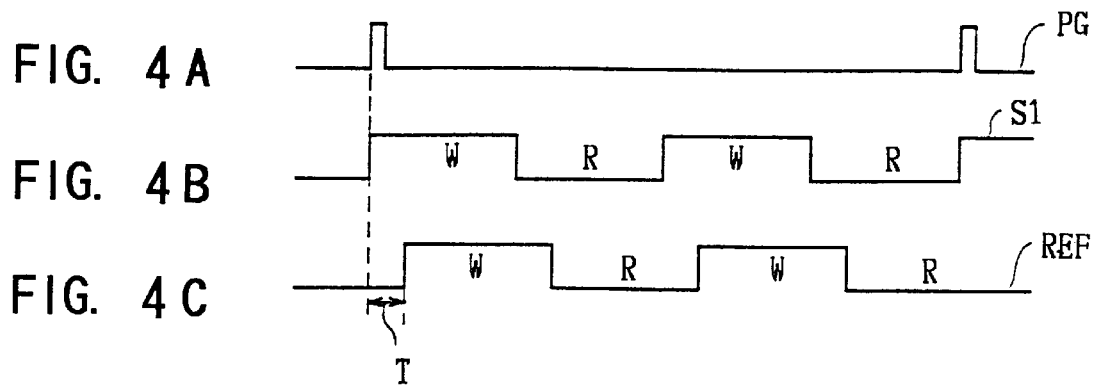
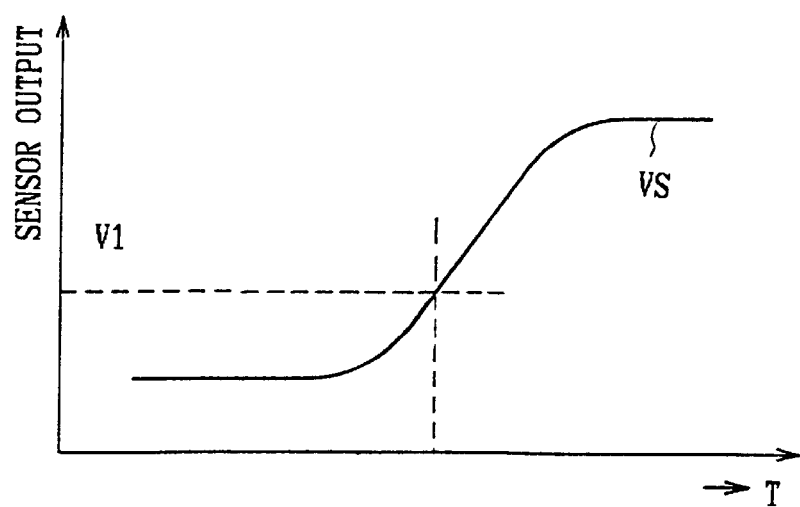
FIG. 5

RECORDING AND REPRODUCING APPARATUS WITH MECHANICAL ADJUSTMENT DATA STORED IN MEMORY ON MECHANICAL MECHANISM ASSEMBLY

This is a continuation of application Ser. No. 08/531,340 filed Sep. 20, 1995, which is a continuation of Ser. No. 08/156,848 filed Nov. 24, 1993 both of which are abandoned.

BACKGROUND OF THE INVENTION

1. Field of the Invention

This invention relates to a recording and/or reproducing apparatus, and more particularly is applicable to an electronic apparatus, for example, a data recorder which sequentially and helically forms recording tracks on a magnetic tape, to record and reproduce a desired data.

2. Description of the Related Art

Heretofore, as a data recorder of this type, there has been proposed a digital data recorder for backing up a computer, in which data is recorded or reproduced on or from tracks formed helically on a magnetic tape as desired, in a similar manner as same as a digital audio tape recorder and the like, the digital data recorder for example being disclosed in U.S. patent application Ser. No. 824,226 filed on Jan. 22, 1992.

This data recorder is composed of a circuit portion and a mechanism portion which are constructed separably of each other in order to be likely to assemble them easily.

That is, as shown in FIG. 1, the data recorder 1 has a mechanism block 2 on a baseplate of which a drum motor, a capstan motor, a reel motor, and the like are mounted together with their peripheral parts.

Further, the data recorder 1 has a circuit block 3 on a printed circuit board on which are formed the mechanism control circuit 4, the signal processing circuit 5, the servo circuit 6 and the like.

The circuit block 3 is connected to the mechanism block 2 permitting the mechanism control circuit 4 to control the servo circuit 6, which drives the capstan motor and the reel motor in order to run the magnetic tape 7 at a predetermined running speed.

Simultaneously with this, the drum motor is driven through the servo circuit 6, thereby rotating the rotary drum 8 at a predetermined speed.

The output signal S1 obtained from the magnetic head mounted on this rotary drum 8 is therefore processed by the signal processing circuit 5 permitting the data as recorded in the magnetic tape 7 to be reproduced. Any recorded signal is fed to this magnetic head permitting any desired data to be recorded.

At this time, in the data recorder 1, the mechanism control circuit 4 controls the servo circuit 6 so as to run the magnetic tape with a predetermined tape tension, and this control information $DT_{DL}$ is allowed to be stored in the rewritable read-only memory (consisting of an EEPROM: Electrically Erasable Programmable Read Only Memory) 10.

In this EEPROM 10, sync information for the reproducing signal S1 in response to the processing timing for the signal processing circuit 5 is stored. The rotating phase of the rotary drum 8 is corrected based on this sync information, so that desired data can be accurately reproduced even if a mounted position of magnetic head is inaccurate.

The detailed configuration of the circuit block 3 is shown in FIG. 2.

The mechanism control circuit 4 is composed of head discriminating signal generating means which generates a head discriminating signal SWP by a head discriminating signal generating circuit 4B on the basis of a drum frequency signal FG and a drum phase signal PG obtained from the rotary drum 8 through a drum PG/FG amplifier 4A.

The head discriminating signal SWP is supplied to a FIFO memory (First In First Out memory) 4C as well as an ATF (automatic track following) sync signal SY. The sync signal SY is obtained based on the reference signal recorded on the recording track, which is extracted from the reproducing output signal S1 of magnetic head 8 through a production signal amplifier 5A and an ATF sync detecting circuit 5B of the signal processing circuit 5. The FIFO memory 4C stores a count data CNT input from a counter 4D which is a self-running counter with counting operation based on a predetermined clock, at a timing of an edge of rising or falling of the head discriminating signal SWP and at a timing of first rising succeeding that of the ATF sync signal SY, to send them to a delay amount detecting circuit 4E.

The delay amount detecting circuit 4E subtracts the count data CNT corresponding to the timing of falling edge or rising edge of the corresponding head discriminating signal SWP, from the count data CNT corresponding to the timing of rising edge of the ATF sync signal SY.

As a result, data of a delay time from the falling edge or rising edge of the head discriminating signal SWP to succeeding first rising of the ATF sync signal SY is detected, and then is stored into an electrical rewriting ROM (EEPROM) 10 as delay amount data $DT_{DL}$ corresponding to the rotary head.

In this manner, the delay amount data $DT_{DL}$ stored into EEPROM 10 is read in recording in order to input to a delayed head discriminating signal (SWPD) generating circuit 4F.

The delayed head discriminating signal SWPD generated in the SWPD generating circuit 4F is input to a DAT (Digital Audio Tape) recording signal generating processing portion 6A of the servo circuit 6, to generate recording data $DT_{REC}$ which is supplied to a respective rotary head at the timing of delay head discriminating signal SWPD, so as to supply as a recording signal $S_{REC}$ to respective rotary heads via a recording amplifier 6B.

In the manufacturing process of the data recorder 1, the circuit block 3 is connected to the mechanism block 2, and then an adjustment magnetic tape 7 on which is recorded the ATF signal based on the DAT format at the correct position, is loaded. The head discriminating signal SWP is delayed so as to scan the rotary heads 8A to 8D on the magnetic tape 7 at a predetermined time, thus the delay amount is stored into the EEPROM 10 as a timing information (hereinafter called "adjusting data"). Thereby, misalignments in positioning the drum motor, capstan motor, reel motor and the like are corrected, permitting any desired data to be recorded and reproduced accurately.

In the data recorder 1 of this type, if any trouble is caused either in the circuit block 3 or in the mechanism block 2, maintenance work can be made simple by totally replacing the circuit block 3 or the mechanism block 2 that is defective with a new one.

However, in case of such a total replacement of the mechanism block 2 or the circuit block 3, all adjustments of the new block are required to be newly made, and their data stored in EEPROM 10. Thus, a problem will remain causing the maintenance work to be more complicated because of doing that much adjustment work.

Even if no defect is found in the delivery, inspection and the like, in the manufacturing process requiring the mechanism block 2 and the like to be replaced, all adjustments should also be newly made and their data should be stored in EEPROM 10, in the same manner as above.

Further, if the data recorder 1 of this type is used exceeding its expected service lifetime, the mechanism block 2 will be required to be replaced, in which case all adjustments should also be newly made and their data should be stored, in the same manner as above.

SUMMARY OF THE INVENTION

In view of the foregoing, an object of this invention is to provide a recording and/or reproducing apparatus in which, the maintenance work and the like can be simplified.

The foregoing object and other objects of this invention have been achieved by the provision of a recording and/or reproducing apparatus, comprising: memory means 22 for storing a specified adjusting data and management data; a control portion 24 for outputting a control signal on the basis of the adjusting data; and a mechanism portion 23 for operating based on the control signal. Also, in the electronic apparatus and the magnetic recording and/or reproducing apparatus: the mechanism portion 23 is separable from the control portion 24; the memory means 22 and the mechanism portion 23 are constructed in one body; and the adjusting data consists of a native data corresponding to the mechanism portion 23, which is necessary to operate the mechanism portion 23 in the specified condition.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 4A to 4C are signal waveforms explaining its operation; and

FIG. 5 is a characteristic curve diagram explaining correction of its tape tension.

DETAILED DESCRIPTION OF THE EMBODIMENT

Figure 3:
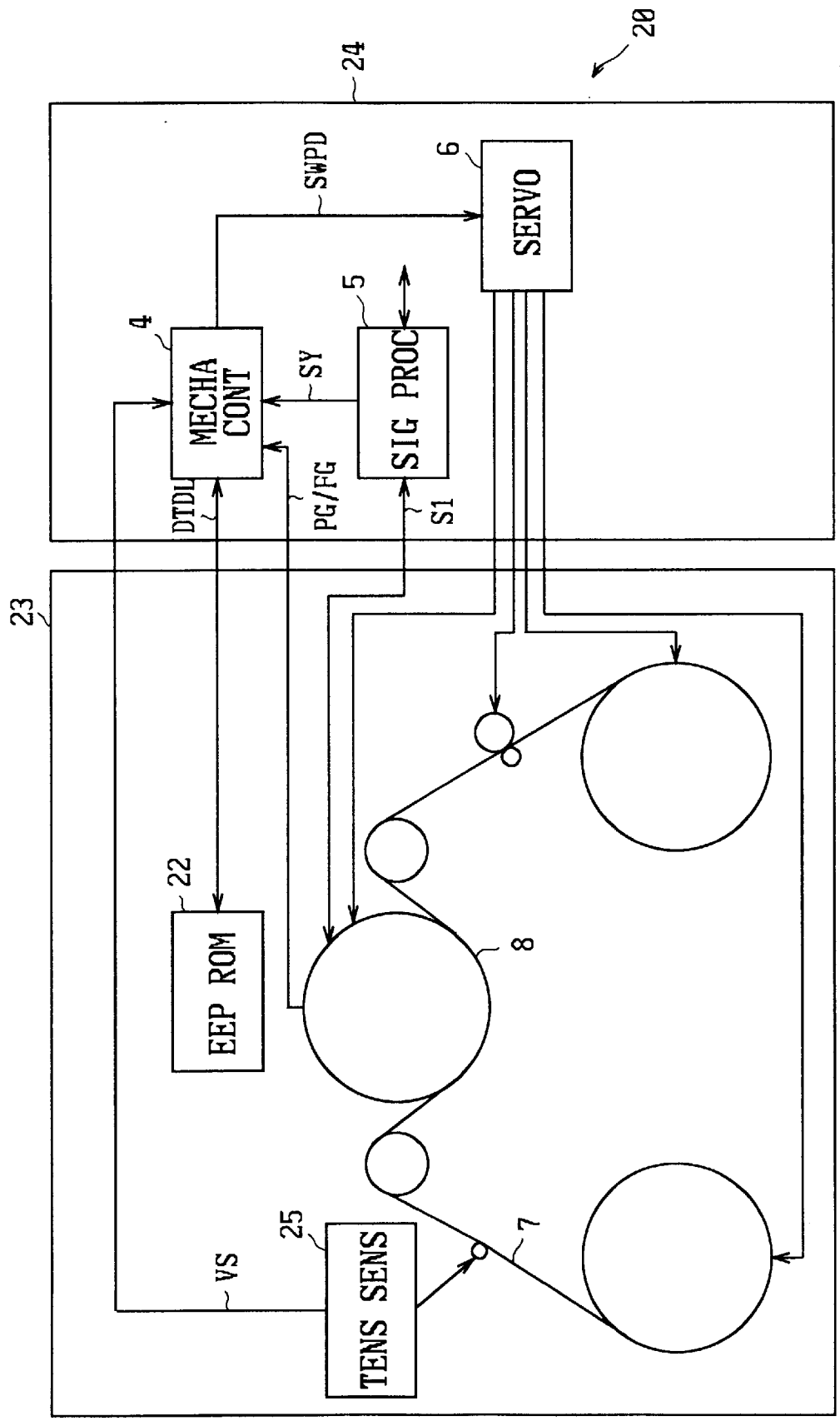
FIG. 3 is a block diagram showing an embodiment of a data recorder according to this invention.

Preferred embodiments of this invention will be described with reference to the accompanying drawings:

In FIG. 3, 20 generally shows a data recorder. In this embodiment, an EEPROM 22 is mounted on the mechanism block 23 instead of the circuit block 24.

In the EEPROM 22, an adjusting data and a control data are stored. Then, in the data recorder 20, the adjusting data are used to drive the mechanism block 23 in the specified condition. Further, the control data are used to easily aggregate unfavorable data and the like in the market.

Figure 1:
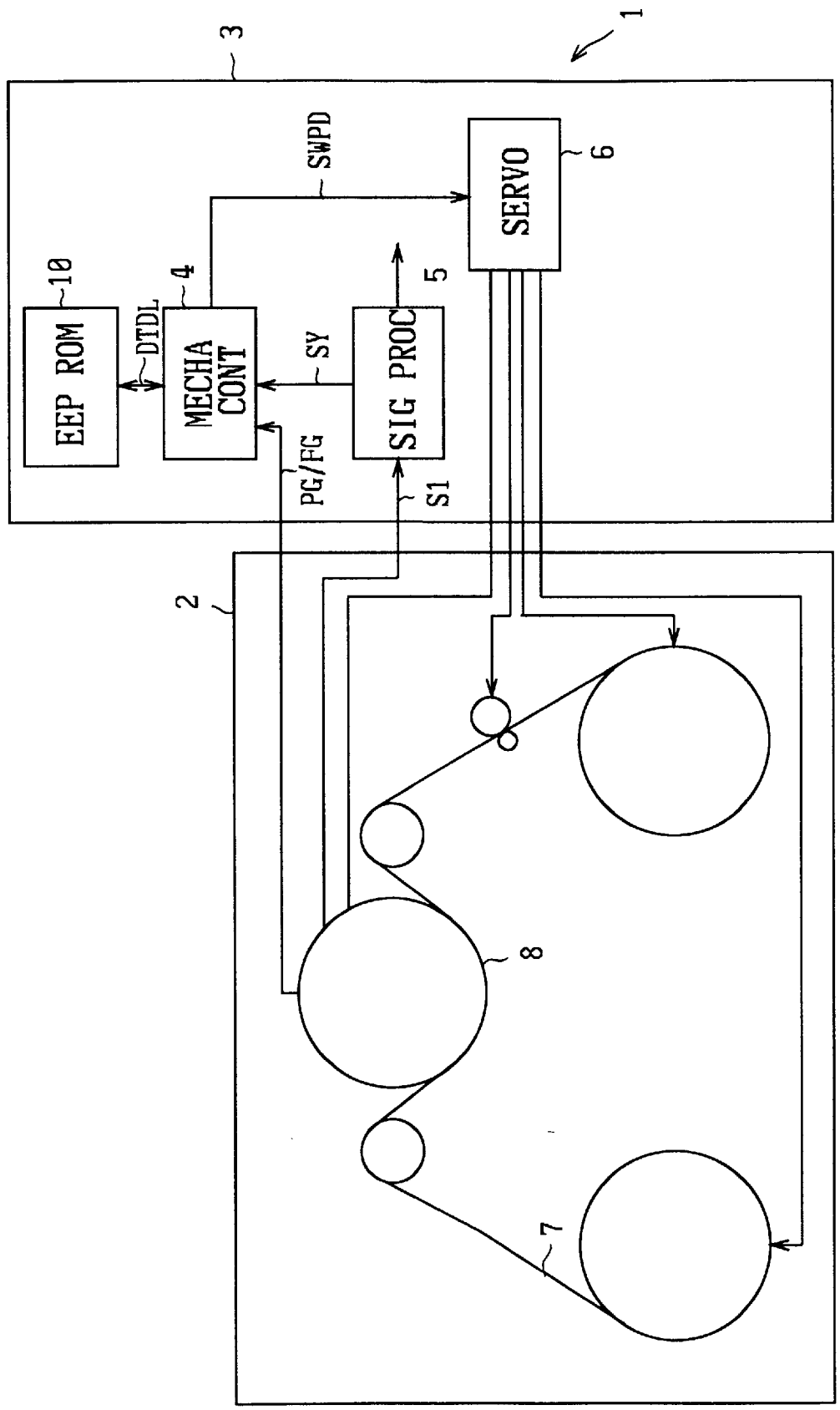
FIG. 1 is a block diagram showing a conventional data recorder.
Figure 2:
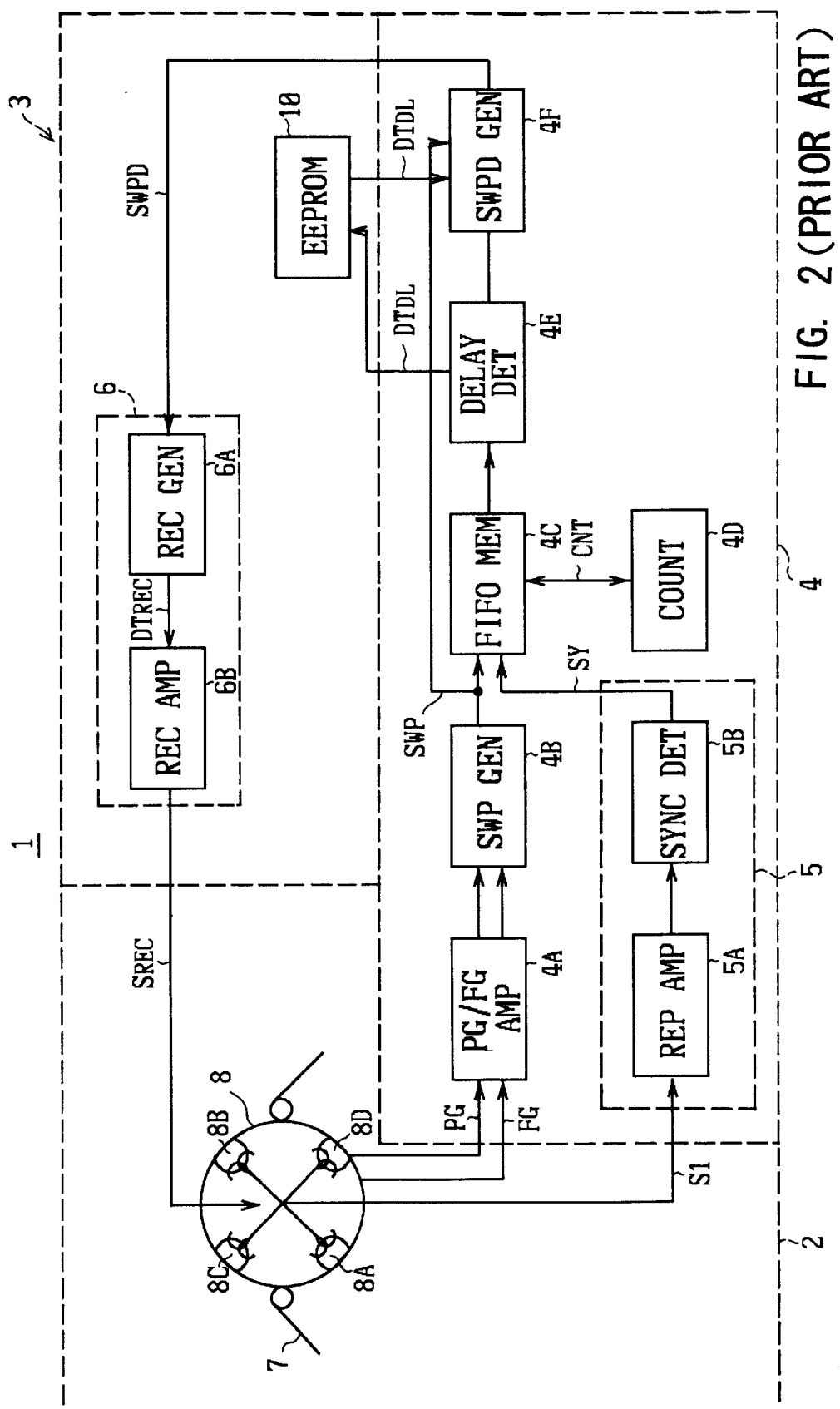
FIG. 2 is a block diagram showing a circuit block of the conventional data recorder in detail.

Similarly as in FIG. 2, in the mechanism block 23, a drum motor is driven to rotate in synchronization with the specified rotating reference signal in a servo circuit 6. The pulse generates a timing signal PG (FIG. 4A) which rises in synchronization with the rotation of a rotary drum 8.

Thereby, in a mechanism portion control circuit 4, the rotating phase of the rotary drum 8 relative to this rotating reference signal is detected, as the timing signal PG (FIG. 4A), which is output to the mechanism portion control circuit 4 in the circuit block 24.

Thereby, in a signal processing circuit 5, a reproducing signal S1 (FIG. 4B) as synchronized with the timing signal PG can be obtained.

Further, a recording signal REC can also be output synchronized with the timing signal PG to sequentially form recording tracks.

In the case of this embodiment, in the rotary drum 8, two pairs of reproducing magnetic heads are arranged at angular intervals of 180°, so that a pair of recording magnetic heads are arranged at 90° away from the pair of reproducing magnetic heads, respectively. In this arrangement of these magnetic heads, the magnetic tape 7 is wound at a wrap angle of 90°.

Therefore, in the data recorder 20, while the recording magnetic heads and the reproducing magnetic heads are scanning on the magnetic tape 7, respectively, the recording signals are supplied or the reproducing signals are processed to record or reproduce a desired data.

On the contrary, in the signal processing circuit 5, a reference signal REF which is in synchronization with the rotating reference signal is used as a reference to process the reproducing signal S1 by a predetermined period (FIG. 4C). The reference signal REF that becomes the reference of this period to be processed is output to the mechanism portion control circuit 4.

Thereby, in the data recorder 20, the signal processing circuit 5 is permitted to process the signals in synchronization with the rotation of the rotary drum 8. At this time, according to any error in mounting a timing generator, a timing deviation T between the reproducing signal S1 and the signal processing circuit 5 will be varied.

Therefore, in the mechanism portion control circuit 4, this timing deviation T is detected during adjustment by using an adjusting magnetic tape, and stored in an EEPROM 22 as control data.

The description of the configuration of detection of the timing deviation T is omitted, as it is the same as the method described as the related art of this invention.

Further, in the mechanism portion control circuit 4, the control data stored in the EEPROM 22 is input in the form of serial data SD in an actual operation. According to the adjusting data, the control data is output to the servo circuit 6 to drive the rotary drum 8 so that this timing deviation T will become the specified value.

Thereby, in the data recorder 20, the adjusting data that is specific data accommodating the magnetic tape running system of the mechanism block 23 are held within the mechanism block 23.

Therefore, in the data recorder 20, even in the case of a total replacement of the circuit block 24 or the mechanism block 23 there is no need for readjustments, so that such readjustments to be made in the prior art in maintenance and the like, may be omitted for simplification.

Further, in the EEPROM 22, a gain data of the servo circuit 6 is allowed to be stored as adjusting data, and in the data recorder 20, the gain data is used as reference to drive the drum motor and the like.

Since some misalignments are unavoidable in the drum motor, capstan motor, and reel motor of this type, in the data recorder 20, the gains of the servo circuit 6 are changed over in turn during adjustment to detect beforehand such gains that can achieve the specified control characteristics. Such gain data as detected may be stored in the EEPROM 22 as adjusting data.

Accordingly, in the data recorder 20, even if the circuit block 24 or the mechanism block 23 is to be totally replaced, the drum motor, capstan motor, and reel motor will be able to be driven on the basis of the specified control characteristics based on the adjusting data that is the specific data accommodating the magnetic tape running system without need for readjustments. Thereby, the overall work may be simplified by omitting such readjustment work in maintenance and the like.

Further, in the EEPROM 22, the tape tension data is stored as adjusting data. In the data recorder 20, the feeding reel motor operation is controlled based on the tension data so that the magnetic tape 7 will be able to operate at the specified tension.

That is, as shown in FIG. 3, in the data recorder 20, the tension sensor 25 is arranged in the magnetic tape operating system. In this tension sensor 25, the roller at its tip presses the magnetic tape 7 to output the sensor output VS corresponding to the intensity of its pressure.

In the mechanism position control circuit 4, by driving the magnetic tape operating system with a given test tape as set to monitor the sensor output VS, the sensor output voltage V1 is detected which is capable of obtaining a specified tape tension with this test tape, and this sensor voltage V1 is stored in the EEPROM 22 as adjusting data.

Further, in the control circuit 4 during an actual operation, the control data is output to the servo circuit 6 in accordance with the adjusting data as stored in the EEPROM 22 so that the sensor output VS will become the sensor output voltage V1, thus controlling the operation of the feeding side reel motor.

Thereby, by storing also the tape tension data, as adjusting data, in the EEPROM 22 arranged on the mechanism block 23 side, even in case of total replacement of the circuit block 24 or the mechanism block 23, the magnetic tape 7 may be run at a specified tape tension without need for making readjustment.

Therefore, in the data recorder 20, much of the adjustment work in maintenance and the like may be omitted to simplify the work.

Further, since, in the data recorder 20 of this type, the mechanism block 23 itself is produced as a separate component and supplied to the final assembly line, if such adjusting data as the specific data for the magnetic tape operating system is stored in the mechanism block 23, it will be possible to omit the adjustment work of the mechanism block 23 in the final assembly line by adjusting this mechanism block 23 in the assembling process of the mechanism block 23, thereby, allowing the assembling work to be simplified to that extent.

In particular, if the mechanism block 23 of this type is supplied by subcontractors, there may be even cases where the mechanism block 23 will not be able to be adjusted in the final assembling process. If this mechanism block 23 can be supplied by adjusting it in its assembling process as in this embodiment, it may be possible to expand the range of application of the data recorder of this type to that extent.

In this respect, even if a means for storing the adjusting data is to be provided in the circuit block 24, by supplying the adjusting data as stored separately in a floppy disc or the like, the mechanism block 23 can be adjusted during its assembling process so that the adjustment work of the mechanism block 23 in the final assembly line may be omitted.

In this case, however, complications in controlling the adjusting data to be supplied through the floppy disc is a disadvantage causing insufficiency in its practical application.

Further, in the EEPROM 22 in this embodiment, the serial data, revision data, and history data of the mechanism block 23 are made to be stored as the control data in addition to the adjusting data, thereby permitting the data recorder 20 to aggregate any desired data easily by reading out these control data, as necessary.

That is, the control data of this type are stored in the EEPROM 22 together with the adjusting data during adjustment. Of these, the serial data are allotted with a series of serial numbers as given to the mechanism block 23.

Thereby, in the data recorder 20, it will be possible to ascertain the production dates and the like, of the mechanism block 23 as recovered from the market through maintenance work and to greatly improve the working efficiency of failure analysis and the like.

To this, in the mechanism block of this type, improvements may be made after the production has been started. In the revision data, such improved versions can be indicated.

Thereby, in the data recorder 20, such versions can be easily judged even without retrieving them from the serial numbers each time, so that the working efficiency of failure analysis and the like, may be greatly improved.

To this, in the history data, the history data of each division of the mechanism block 23 consisting of operation hours of the drum motor, writing and reading frequencies of the EEPROM, tape cassette setting frequencies and the like, will be stored. In the mechanism block control circuit 4, the history data will be renewed in response to the controlling operation in an actual operation.

Thereby, in the data recorder 20, the service life of each part in the market can be totaled based on this history data. This history data may be read out for replacement of any parts, as required, before their service lives are reached, and for further improvement of their ways of use.

In the construction of this embodiment, the EEPROM 22 is arranged on the side of mechanism block 23 to store the adjusting data, thereby allowing the specific adjusting data accommodating the mechanism block 23 to be maintained together with the mechanism block 23, and thereby, allowing the storing work of these adjustment data to be omitted for work simplification even in case of separate replacement of the mechanism block 23 and the circuit block 24.

Meanwhile, described in the above embodiment are the case of storing the tape tension data, the advantageous data of the servo circuit 6 and the data of time-lag T, as adjusting data, in the EEPROM. However, this invention is not only limited to this, but may be applied more widely to cases where any data of these and various other adjusting data in addition to these are to be stored, as necessary.

Further, in the above embodiment, described are the cases of storing the control data as well as the adjusting data. However, this invention is not only limited to this, but may be made to store the adjusting data only, and also the control data other than the serial data, revision data, and history data.

Further, in the above embodiment, described are the cases of storing the adjusting data in the EEPROM. However, this invention is not only limited to this, but may be applied more widely to rewritable non-volatile memory including, for example, flash ROM etc.

Further, in the above embodiment, described are the cases of an application of the invention to a data recorder. However, this invention is not only limited to this, but may be applied more widely to various electronic devices which hold the mechanism portion and control portion in one unit but have separable subassemblies.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A recording and reproducing apparatus for recording to and reproducing from a tape-shaped recording medium, said apparatus comprising:

a first assembly including a mechanism portion having mechanical mechanism parts and electromechanical parts for advancing said tape-shaped medium in the recording and reproducing apparatus, recording predetermined data on the recording medium, reproducing data recorded on the recording medium, and for sensing a tension of the recording medium and having electronic memory means for storing individual adjusting data relating to operating characteristics specific to said mechanism portion for controlling said mechanical mechanism parts and said electromechanical parts to operate with predetermined operating characteristics and for storing management data related to a history of a production, an improvement and an operation of said mechanical mechanism parts, said adjusting data being stored into said memory means during an adjusting stage of assembling said first assembly, and said first assembly being void of electronic circuits other than said memory means and said electromechanical parts;

a second assembly separately arranged from said first assembly and including operating circuits and a control circuit portion for outputting control signals for controlling said mechanical mechanism parts and said electromechanical parts of said mechanism portion on the basis of said adjusting data stored in said memory means, said second assembly containing electronic circuits separably connected to said first assembly containing said mechanism portion and said memory means; and a signal line for communicating said adjusting data and said management data between said memory means and said control portion, and supplying said control signals from said control portion to said mechanism portion.

2. A recording and reproducing apparatus according to claim 1, wherein said memory means comprises a rewritable non-volatile memory.

3. A recording and reproducing apparatus according to claim 1, wherein:

said recording medium is a magnetic tape;

said control portion includes a servo circuit for driving said mechanism parts of said mechanism portion;

said adjusting data includes tension data of said magnetic tape, gain data of said servo circuit of said control portion, and timing data of said mechanism parts; and said control portion further comprises a signal processing portion.

4. A recording and reproducing apparatus according to claim 1, wherein said management data related to a history of said mechanism parts includes serial number data for production information, revision data for improvement information, and usage history data for operation information, said serial number data and said revision data being stored into said memory means at said adjusting stage of assembling said first assembly, and said usage history data being initially stored into said memory means during said assembling said first assembly and updated during operation of said mechanism parts.

5. A recording and reproducing apparatus according to claim 1, wherein said mechanism parts includes a drum motor and said management data includes a service time of said drum motor, a number of writing or reading events of said memory means, and a number of events of an insertion or ejection of a tape cassette, said management data being initially stored into said memory means during said assembling said first assembly and updated during operation of said mechanism parts.

* * * * *